United States Patent
Onoue et al.

(10) Patent No.: US 9,711,824 B2
(45) Date of Patent: Jul. 18, 2017

(54) SECONDARY BATTERY AND METHOD FOR CHARGING AND DISCHARGING SECONDARY BATTERY

(71) Applicants: Murata Manufacturing Co., Ltd., Nagaokakyo-shi, Kyoto-fu (JP); Carlit Holdings Co., Ltd., Chuo-ku, Tokyo (JP)

(72) Inventors: Tomoaki Onoue, Nagaokakyo (JP); Masaharu Sato, Nagaokakyo (JP); Eiji Kokubu, Shibukawa (JP); Kazumi Chiba, Tokyo (JP); Kazato Yanada, Shibukawa (JP); Toshiyuki Kiryu, Shibukawa (JP); Teruhisa Takada, Shibukawa (JP); Hidehisa Mokudai, Wako (JP); Toru Sukigara, Wako (JP)

(73) Assignees: MURATA MANUFACTURING CO., LTD., Nagaokakyo-Shi, Kyoto-Fu (JP); CARLIT HOLDINGS CO., LTD., Chuo-Ku, Tokyo (JP)

( * ) Notice: Subject to any disclaimer, the term of this patent is extended or adjusted under 35 U.S.C. 154(b) by 262 days.

(21) Appl. No.: 14/707,384

(22) Filed: May 8, 2015

(65) Prior Publication Data
US 2015/0263387 A1 Sep. 17, 2015

Related U.S. Application Data

(63) Continuation of application No. PCT/JP2013/079998, filed on Nov. 6, 2013.

(30) Foreign Application Priority Data

Nov. 9, 2012 (JP) ................................. 2012-247699

(51) Int. Cl.
| | |
|---|---|
| *H02J 7/00* | (2006.01) |
| *H01M 10/0569* | (2010.01) |
| *H01M 4/137* | (2010.01) |
| *H01M 4/1399* | (2010.01) |
| *H01M 4/04* | (2006.01) |
| *H01M 4/60* | (2006.01) |
| *H01M 10/0525* | (2010.01) |
| *H01M 10/44* | (2006.01) |
| *H01M 10/052* | (2010.01) |

(52) U.S. Cl.
CPC ..... *H01M 10/0569* (2013.01); *H01M 4/0447* (2013.01); *H01M 4/137* (2013.01); *H01M 4/1399* (2013.01); *H01M 4/602* (2013.01); *H01M 10/052* (2013.01); *H01M 10/0525* (2013.01); *H01M 10/44* (2013.01); *H01M 2220/30* (2013.01); *H01M 2300/0028* (2013.01)

(58) Field of Classification Search
CPC ......... Y02E 60/12; H02J 7/0068; H02J 7/022; H02J 7/0031; H01M 10/44
USPC ......................................................... 320/128
See application file for complete search history.

(56) References Cited

U.S. PATENT DOCUMENTS

| | | | | | |
|---|---|---|---|---|---|
| 4,275,186 | A | * | 6/1981 | Kawakami | ........... C08G 63/688 528/174 |
| 4,547,439 | A | * | 10/1985 | Genies | ................. C08G 61/122 429/105 |
| 5,232,810 | A | * | 8/1993 | Ziolo | ..................... B82Y 30/00 430/108.1 |
| 5,523,179 | A | | 6/1996 | Chu | |
| 5,728,489 | A | * | 3/1998 | Gao | ................. H01M 10/0565 429/309 |
| 6,302,928 | B1 | | 10/2001 | Xu et al. | |
| 6,677,153 | B2 | * | 1/2004 | Iversen | ................ C12N 15/113 435/375 |
| 2012/0156555 | A1 | | 6/2012 | Hojo et al. | |

FOREIGN PATENT DOCUMENTS

| | | |
|---|---|---|
| JP | H08-511615 A | 11/1997 |
| JP | 2002-535854 A | 10/2002 |
| JP | 2006-112630 A | 5/2008 |
| JP | 2008-147015 A | 6/2008 |
| JP | 2008-218326 A | 9/2008 |
| WO | WO 2012/001988 A1 | 1/2012 |
| WO | WO 2012/133204 A1 | 10/2012 |

OTHER PUBLICATIONS

International Search Report issued for PCT/JP2013/079998, date of mailing Jan. 21, 2014.

* cited by examiner

*Primary Examiner* — Arun Williams
(74) *Attorney, Agent, or Firm* — Arent Fox LLP

(57) ABSTRACT

A secondary battery that has an electrode active material mainly composed of a low-molecular-weight multi-electron organic compound that has two or more electrons to be involved in a battery electrode reaction, and a solvent for an electrolyte solution that contains a sulfone compound. Apart of the electrode active material is dissolved in and reacted with the electrolyte solution at the first charge and discharge, thereby oligomerizing a part of the electrode active material.

19 Claims, 11 Drawing Sheets

SECONDARY BATTERY AND METHOD FOR CHARGING AND DISCHARGING SECONDARY BATTERY

CROSS REFERENCE TO RELATED APPLICATIONS

This application is a continuation application of international patent application Serial No. PCT/JP2013/079998 filed 6 Nov. 2013, which published as PCT Publication No. WO2014/073560 on 15 May 2014, which claims benefit of Japan patent application No. 2012-247699 filed 9 Nov. 2012, the entire content of which are incorporated herein by reference.

FIELD OF THE INVENTION

The present invention relates to a secondary battery and a method for charging and discharging a secondary battery, and more particularly relates to a secondary battery which has an electrode active material mainly composed of a multi-electron organic compound and repeats charge and discharge by using a battery electrode reaction of the electrode active material, and a method for charging and discharging the secondary battery.

BACKGROUND OF THE INVENTION

With the market expansion of mobile electronic devices such as cellular phones, laptop personal computers and digital cameras, a long-life secondary battery having high energy density is growingly developed as a cordless power source of these electronic devices.

An electrode active material of structural elements of the secondary battery is a substance directly contributing to electrode reactions of a charge reaction and a discharge reaction in the battery, and has a central role in the secondary battery. That is, the electrode reaction in the battery is a reaction which occurs associated with giving and receiving of electrons by applying a voltage to an electrode active material electrically connected to an electrode located in an electrolyte, and the electrode reaction in the battery progresses during charge and discharge of the battery. Accordingly, as described above, the electrode active material systemically has a central role in the secondary battery.

Thus, in recent years, organic materials having an oxidation-reduction activity receive attention as this kind of a material for an electrode active material. In the organic materials, it is thought that since multi-electrons of two or more electrons can be involved in the oxidation-reduction reaction, by using such a characteristic for an electrode reaction in the battery, a secondary battery having a larger capacity density than inorganic materials can be achieved.

For example, the document 1 proposes an electrode for a battery which has a structural unit represented by the following formula (1'):

—(NH—CS—CS—NH)—            (1')

and includes a rubeanic acid or rubeanic acid polymer capable of being coupled with lithium ions.

The rubeanic acid or rubeanic acid polymer containing a dithione structure represented by the general formula (1') is coupled with lithium ions during reduction, and releases the coupled lithium ions during oxidation. It is possible to perform charge and discharge by using such a reversible oxidation-reduction reaction of rubeanic acid or rubeanic acid polymer. In the document 1, for example, a secondary battery having a capacity density of about 400 Ah/kg was obtained in the case of using rubeanic acid for the positive electrode active material.

On the other hand, the electrode active material of the secondary battery varies significantly in volume according to chemical changes associated with the charge-discharge reaction, and consequently, the electrode active material in a solid state may be destroyed or dissolved in an electrolyte solution so that it does not function as the electrode active material. That is, in the secondary battery using an organic material in the electrode active material, although the electrolyte solution is prepared by dissolving an electrolyte salt such as a Li salt in a solvent, charging and discharging is performed by using an oxidation-reduction reaction of a molecule itself, and therefore the electrode active material is easily dissolved in the electrolyte solution in contrast to a lithium ion secondary battery performing charging and discharging in a state of maintaining a crystal system. Thus, the suppression of such dissolution of the electrode active material in the electrolyte solution is investigated.

For example, the document 2 proposes a positive electrode including a mixture, wherein the mixture contains an active sulfur and an electron conductor which is mixed with the active sulfur and is configured so that electrons can migrate between the active sulfur and the electron conductor, an ion conductor which is mixed with the active sulfur and is configured so that ions can migrate between the active sulfur and the ion conductor and in the mixture, the utilization of the active sulfur for an electrochemical reaction is approx. 10% to approx. 100%.

In the document 2, the positive electrode active material is formed of a mixture of a sulfur element, a polymer electrolyte such as a polyethylene oxide having ion conductivity and an electron conductive substance such as polyaniline, and an aprotic liquid such as sulfolane, dimethyl sulfone, dialkyl carbonate, tetrahydrofuran (THF), dioxolan, propylene carbonate (PC), ethylene carbonate (EC), dimethyl carbonate (DMC), butyrolactone, N-methylpyrrolidinone, tetramethylurea, glyme, ether, crown ether and dimethoxyethane, is used for a solvent of the electrolyte solution, and thereby, a battery cell is formed.

Further, the document 3 proposes a battery including a negative electrode, a solid composite positive electrode containing an electrically active sulfur-containing substance, and an electrolyte interposed therebetween.

The document 3 describes, as a preferred embodiment of an electrolyte, a mixture of one or more ionic electrolyte salt and one or more electrolyte solvent selected from the group consisting of N-methylacetamide, acetonitrile, carbonates, sulfolane, sulfone, N-alkylpyrrolidone, dioxolan, aliphatic ethers, cyclic ethers, glyme and siloxane. Further, in the document 3, 1,3-dioxolan is used as the electrolyte solvent and dimethoxy ethane is used as the ionic electrolyte salt to prepare an electrolyte, and a battery in which a positive electrode material contains a substance containing electrically active sulfur, is prepared.

The document 1: JP No. 2008-147015A (claim 1, par. [0011], FIG. 3, and FIG. 5)

The document 2: JP No. 09-511615A (claim 1, pp. 32-33)

The document 3: JP No. 2002-532854A (claim 1, claim 83, pars. [0031] and [0088])

In the document 1, although the two-electron reaction is initiated by using the rubeanic acid having a dithione structure, when a low-molecular-weight compound such as a rubeanic acid is used, dissolution in an electrolyte solution or contamination of the electrode due to a dissolved compound easily occurs, as described above, and therefore the battery lacks the stability for repeated charge and discharge. Further, when a polymer compound like a rubeanic acid polymer is used, interactions between molecules within the rubeanic acid polymer are large, while dissolution in an electrolyte solution or contamination of the electrode can be suppressed. Therefore, the movement of ions is interfered with and the proportion of the active material to be used effectively is reduced.

In the document 2 and the document 3, although a sulfur-based compound is used for the positive electrode active material and an electrolyte solution having sulfolane, dioxolan or the like used as the solvent is prepared, and thereby a battery is formed, it is in a difficult situation to attain a secondary battery having stable and excellent cycle characteristics even though using such an electrolyte solution.

Although as described above, a secondary battery is prepared by combined use of an organic compound and an electrolyte respectively indicated in the prior art, it is not yet possible to achieve a long-life secondary battery which has adequately high energy density and high output, and has excellent cycle characteristics.

The present invention has been made in view of such a situation, and it is an object of the present invention to provide a secondary battery having a high capacity density and high output, and excellent cycle characteristics with small deterioration of capacity even in repeating charge and discharge, and a method for charging and discharging a secondary battery.

SUMMARY OF THE INVENTION

The present inventors have made studies by using, for the electrode active material, a low-molecular-weight multi-electron organic compounds (dithione compounds, dione compounds, diamine compounds, etc.) which has high charge-discharge efficiency and can achieve a high capacity density and using a electrolyte solution using a sulfone compound for a solvent, and consequently have found that the charge-discharge reaction can be stably repeated and thereby, cycle characteristics can be improved when apart of the electrode active material is dissolved in and reacted with the electrolyte solution to be oligomerized at the first time of charge and discharge.

The present invention has been made based on such findings, and the secondary battery according to the present invention is characterized by a secondary battery containing an electrode active material and an electrolyte solution formed by dissolving an electrolyte salt in a solvent, and repeating charging and discharging by using a battery electrode reaction of the electrode active material, wherein the electrode active material contains, as the main component thereof, a low-molecular-weight multi-electron organic compound which has two or more electrons to be involved in the battery electrode reaction, the solvent contains a sulfone compound, and a part of the electrode active material is oligomerized at least at the first time of charge and discharge.

Further, in the secondary battery of the present invention, the sulfone compound is preferably represented by the general formula:

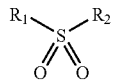

In the above formula, $R_1$ and $R_2$ represent at least one of a linear alkyl group and a branched alkyl group respectively having 1 to 5 carbon atoms, and $R_1$ and $R_2$ include both of the case in which they are the same and the case in which they are linked with one another to form a saturated or unsaturated ring.

In the secondary battery of the present invention, the multi-electron organic compound preferably contains, in structural unit thereof, at least one selected from the group consisting of dithione compounds having a dithione structure, dione compounds having a dione structure, and diamine compounds having a diamine structure.

Further, in the secondary battery of the present invention, the dithione compound is preferably represented by the general formula:

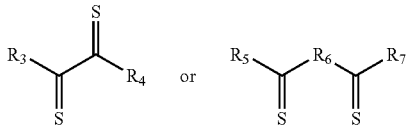

In the above formulas, $R_3$ to $R_5$ and $R_7$ represent any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group, and linking groups composed of combination of one or more thereof, and these $R_3$ to $R_5$ and $R_7$ include the case in which they are the same and the case in which they are linked with one another to form a saturated or unsaturated cyclic structure. Further, $R_6$ represents at least one of a substituted or unsubstituted alkylene group, a substituted or unsubstituted arylene group and a substituted or unsubstituted imino group, and it includes the case in which the imino groups are linked with each other.

Further, in the secondary battery of the present invention, the dione compound is preferably represented by the general formula:

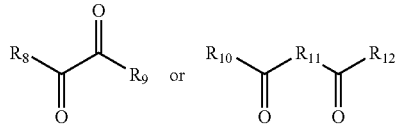

In the above formulas, $R_8$ to $R_{10}$ and $R_{12}$ represent any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group, and linking groups composed of combination of one or more thereof, and these $R_8$ to $R_{10}$ and $R_{12}$ include the case in which they are the same and the case in which they are linked with one another to form a saturated or unsaturated cyclic structure. Further, $R_{11}$ represents at least one of a substituted or unsubstituted alkylene group, a substituted or unsubstituted arylene group and a substituted or unsubstituted imino group, and it includes the case in which the imino groups are linked with each other.

Further, in the secondary battery of the present invention, the diamine compound is preferably represented by the general formula:

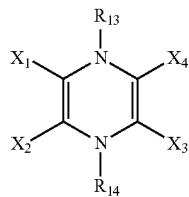

In the above formula, $R_{13}$ and $R_{14}$ represent any of a substituted or unsubstituted alkyl group, a substituted or unsubstituted alkylene group, a substituted or unsubstituted arylene group, a substituted or unsubstituted carbonyl group, a substituted or unsubstituted acyl group, a substituted or unsubstituted alkoxycarbonyl group, a substituted or unsubstituted ester group, a substituted or unsubstituted ether group, a substituted or unsubstituted thioether group, a substituted or unsubstituted amine group, a substituted or unsubstituted amide group, a substituted or unsubstituted sulfone group, a substituted or unsubstituted thiosulfonyl group, a substituted or unsubstituted sulfonamide group, a substituted or unsubstituted imine group, a substituted or unsubstituted azo group, and linking groups composed of combination of one or more thereof. $X_1$ to $X_4$ represent at least one of a hydrogen atom, a halogen atom, a hydroxyl group, a nitro group, a cyano group, a carboxyl group, a substituted or unsubstituted alkyl group, a substituted or unsubstituted alkenyl group, a substituted or unsubstituted cycloalkyl group, a substituted or unsubstituted aryl group, a substituted or unsubstituted aromatic heterocyclic group, a substituted or unsubstituted aralkyl group, a substituted or unsubstituted amino group, a substituted or unsubstituted alkoxy group, a substituted or unsubstituted aryloxy group, a substituted or unsubstituted alkoxycarbonyl group, a substituted or unsubstituted aryloxycarbonyl group, a substituted or unsubstituted acyl group and a substituted or unsubstituted acyloxy group, and these substituents include the case of forming a cyclic structure therebetween.

Further, in the secondary battery of the present invention, the electrode active material is preferably contained in any one of a reaction starting material, a reaction product and an intermediate product in at least a discharge reaction of the electrode reaction in the battery.

Moreover, it is preferred that the secondary battery of the present invention has a positive electrode and a negative electrode, and the positive electrode contains the electrode active material as the main component thereof.

A method for charging and discharging a secondary battery according to the present invention is characterized by a method for charging and discharging a secondary battery containing an electrode active material and an electrolyte solution formed by dissolving an electrolyte salt in a solvent and repeating charging and discharging by using a battery electrode reaction of the electrode active material, wherein the electrode active material contains, as the main component thereof, a low-molecular-weight multi-electron organic compound which has two or more electrons to be involved in the battery electrode reaction, the solvent contains a sulfone compound, and a part of the electrode active material is dissolved in and reacted with the electrolyte solution to be oligomerized at least at the first time of charge and discharge.

In accordance with the secondary battery of the present invention, the charge-discharge reaction is stabilized and thereby it becomes possible to improve cycle characteristics since in the secondary battery containing an electrode active material and an electrolyte solution formed by dissolving an electrolyte salt in a solvent and repeating charging and discharging by using a battery electrode reaction of the electrode active material, the electrode active material contains, as the main component thereof, a low-molecular-weight multi-electron organic compound which has two or more electrons to be involved in the battery electrode reaction, the solvent contains a sulfone compound, and a part of the electrode active material is oligomerized at least at the first time of charge and discharge.

Furthermore, the electrode active material contains the organic compound as the main component thereof, and therefore the resulting secondary battery is a secondary battery in which an environmental burden is low and its safety is taken into consideration.

In accordance with the method for charging and discharging a secondary battery of the present invention, it is possible to perform a stable charge-discharge treatment and obtain a secondary battery having excellent cycle characteristics since in the method for charging and discharging a secondary battery containing an electrode active material and an electrolyte solution formed by dissolving an electrolyte salt in a solvent and repeating charging and discharging by using a battery electrode reaction of the electrode active material, the electrode active material contains, as the main component thereof, a low-molecular-weight multi-electron organic compound which has two or more electrons to be involved in the battery electrode reaction, the solvent contains a sulfone compound, and a part of the electrode active material is dissolved in and reacted with the electrolyte solution to be oligomerized at least at the first time of charge and discharge.

The above and other objects, features, and advantages of the invention will become more apparent from the following description.

DETAILED DESCRIPTION OF THE INVENTION

An embodiment of the present invention will be described in detail.

Figure 1:
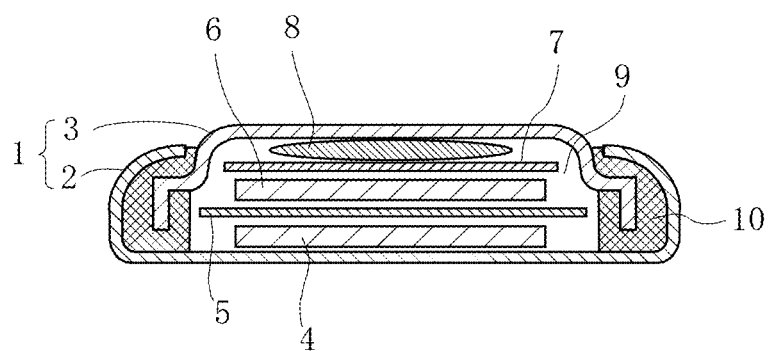
FIG. 1 is a sectional view showing an embodiment of a coin type battery as a secondary battery according to the present invention.

FIG. 1 is a sectional view showing a coin type secondary battery as an embodiment of a secondary battery according to the present invention.

A battery case 1 has a positive electrode case 2 and a negative electrode case 3, and the positive electrode case 2 and the negative electrode case 3 are both formed into the shape of a disc-like thin plate. A positive electrode 4, which is obtained by forming a positive electrode active material into a sheet shape, is arranged at a bottom center of the positive electrode case 2 constituting a positive electrode current collector. Further, a separator 5 formed of a porous film such as polypropylene is laminated on the positive electrode 4, and a negative electrode 6 is laminated on the separator 5. As a material of the negative electrode 6, for example, copper having a lithium metal foil overlaid thereon, and the metal foil having a lithium occlusion material such as graphite or hard carbon applied thereto can be used. A negative electrode current collector 7 formed of Cu or the like is laminated on the negative electrode 6, and a metallic spring 8 is placed on the negative electrode current collector 7. Further, an electrolyte solution 9 is filled into an internal space, and the negative electrode case 3 is attached fixedly to the positive electrode case 2 against a biasing force of the metallic spring 8, and these cases are sealed with a gasket 10 interposed therebetween.

In the secondary battery, the positive electrode active material has, as the main component thereof, a low-molecular-weight multi-electron organic compound which has two or more electrons to be involved in a battery electrode reaction. The multi-electron organic compound is not particularly limited as long as it is an organic compound which is of low-molecular-weight and has two or more electrons to be involved in a battery electrode reaction, and preferred is an organic compound containing, in structural unit thereof, at least one selected from the group consisting of dithione compounds having a dithione structure, dione compounds having a dione structure, and diamine compounds having a diamine structure.

The electrolyte solution 9 is formed of an electrolyte salt and a solvent in which the electrolyte salt is dissolved, and a sulfone compound is contained in the solvent. That is, the electrolyte solution 9 is interposed between the positive electrode 4 and an opposed electrode of the positive electrode 4—i.e. the negative electrode 6, to perform charge carrier transport between both electrodes, and furthermore, in the present embodiment, the electrolyte salt is used in a state of being dissolved in or being compatible with the solvent having contained the sulfone compound. The electrolyte solution 9 is configured so that a part of the organic compound predominantly constituting the positive electrode active material is oligomerized at least at the first time of charge and discharge.

That is, in recent years, the electrode active materials containing the organic compound as a main component receive attention, and among these materials, the above-mentioned dithione compounds, dione compounds and diamine compounds are promising material for an active material capable of realizing high charge-discharge efficiency and a high capacity density.

However, as described in the above-mentioned technical problem, in these organic compounds, when a low-molecular-weight organic compound is used, dissolution in an electrolyte solution 9 or contamination of the electrode due to the dissolved compound easily occurs, and therefore the battery lacks the stability for repeated charge and discharge. On the other hand, when a polymer compound is used, interactions between molecules within the polymer compound are large, and therefore the movement of ions is interfered with and there is a possibility that the proportion of the active material to be used effectively may be reduced.

Thus, in the present embodiment, the secondary battery is configured so that a part of the electrode active material is oligomerized at least at the first time of charge and discharge by using the low-molecular-weight multi-electron organic compound and by containing a sulfone compound in a solvent of the electrolyte solution 9, and thereby, a charge-discharge reaction is stabilized and hence a cycle characteristics are improved.

It is thought to be for the following reason that the cycle characteristic is improved by oligomerization of the organic compound, as described above.

That is, it is thought that when a part of the positive electrode active material is dissolved in the electrolyte solution 9 and polymerized with a sulfone compound to be oligomerized, a part of the oligomerized organic compound remains in the vicinity of the positive electrode 4 and a part of the rest of the oligomerized organic compound moves near the negative electrode 6. Then, it is thought that, when the oligomerized organic compound is present in the vicinity of the positive electrode 4, the oligomerized organic compound becomes a barrier, which suppresses excessive dissolution of the positive electrode active material in the electrolyte solution 9. Moreover, when the oligomerized organic compound is present in the vicinity of the negative electrode 6, an solid-electrolyte interface (hereinafter referred to as "SEI"), through which only lithium ions selectively pass and electrons do not pass, is formed on the negative electrode 6, and consequently the negative electrode 6 can perform occlusion/release of lithium smoothly.

Thereby, it is thought that the charge-discharge reaction is stabilized and the cycle characteristics can be improved.

Although the sulfone compound contained in the solvent is not particularly limited, a compound represented by the general formula (1) can be preferably used.

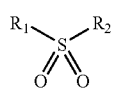
(1)

In the general formula (1), $R_1$ and $R_2$ represent at least one of a linear alkyl group and a branched alkyl group respectively having 1 to 5 carbon atoms, and $R_1$ and $R_2$ include both of the case in which they are the same and the case in which they are linked with each other to form a saturated or unsaturated ring.

Sulfone compounds falling within the category of the compounds represented by the general formula (1) may, for example, include cyclic sulfone compounds represented by the following chemical formula (1a) or the chemical formula (1b), and chain sulfone compounds represented by the following chemical formulas (1c)-(1h).

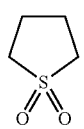
(1a)

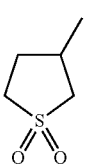
(1b)

(1c)

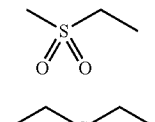
(1d)

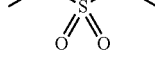
(1e)

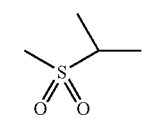
(1f)

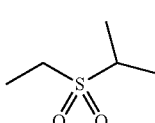
(1g)

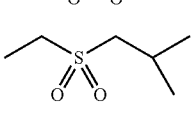
(1h)

Although the content of the sulfone compound in the electrolyte solution 9 is not particularly limited, the content in the solvent is preferably 50% by mass or more in order to exert a desired effect. Further, two or more kinds of sulfone compounds represented by the above chemical formulas (1a)-(1h) may be combined, or a compound other than the sulfone compound may be contained as an additive.

Besides, the electrolyte salt contained in the electrolyte solution 9 is not particularly limited, and for example, $LiPF_6$, $LiClO_4$, $LiBF_4$, $LiCF_3SO_3$, $Li(CF_3SO_2)_2$, $LiN(C_2F_5SO_2)_2$, $LiC(CF_3SO_2)_3$, $LiC(C_2F_5SO_2)_3$ and the like can be used.

Next, the above-mentioned organic compounds—i.e. dithione compounds, dione compounds and diamine compounds—predominantly constituting the positive electrode active material will be described in detail.

Dithione Compound

In the dithione compound, the stability during charge and discharge (an oxidized state and a reduced state) is excellent, and multi-electron reaction of two-electrons or more can occur in the oxidation-reduction reaction. Accordingly, when the dithione compound is used for the positive electrode active material, and furthermore the sulfone compound is contained in the electrolyte solution 9, and moreover a part of the electrode active material is oligomerized at least at the first time of charge and discharge, a charge-discharge reaction occurring between the positive electrode 4 and the negative electrode 6 is stabilized and thereby charge and discharge of a multi-electron reaction can be stably repeated, and therefore it becomes possible to obtain a secondary battery having a high capacity density, which has high charge-discharge efficiency and improved cycle characteristics.

Although such a dithione compound is not particularly limited as long as it has a dithione structure in its structural unit, a compound represented by the following general formula (2) or (3) can be preferably used.

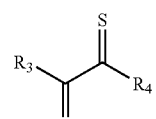
(2)

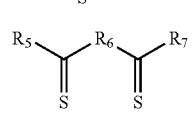
(3)

In the general formulas (2) and (3), $R_3$ to $R_5$ and $R_7$ represent any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group, and linking groups composed of combination of one or more thereof, and these $R_3$ to $R_5$ and $R_7$ include the case in which they are the same and the case in which they are linked with one another to form a saturated or unsaturated cyclic structure. Further, $R_6$ represents at least one of a substituted or unsubstituted alkylene group, a substituted or unsubstituted arylene group and a substituted or unsubstituted imino group, and it includes the case in which the imino groups are linked with each other.

The following chemical reaction formula (I) shows an example of the charge-discharge reaction which is predicted when the dithione compound represented by the general formula (2) is used for the positive electrode active material and Li is used for a cation of an electrolyte salt.

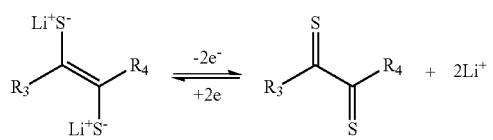
(I)

The following chemical reaction formula (II) shows an example of the charge-discharge reaction which is predicted when the dithione compound represented by the general formula (3) is used for the positive electrode active material and Li is used for a cation of an electrolyte salt.

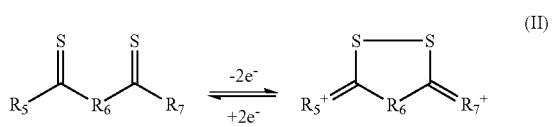
(II)

Although the dithione compound is not particularly limited as long as it is a low-molecular-weight compound which can be oligomerized, when a portion other than a dithione structure is large, a molecular weight is increased and therefore an electric storage capacity per unit mass, or a capacity density, is reduced. Accordingly, the molecular weight of a portion other than the dithione structure is preferably small.

Dithione compounds falling within the category of the compounds represented by the general formula (2) may, for example, include organic compounds represented by the following chemical formula (2a) or (2b), and dithione compounds falling within the category of the compounds represented by the general formula (3) may, for example, include organic compounds represented by the following chemical formulas (3a)-(3c).

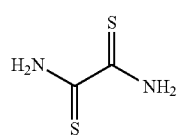
(2a)

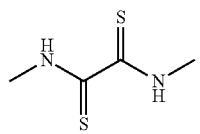
(2b)

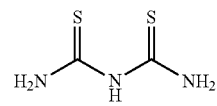
(3a)

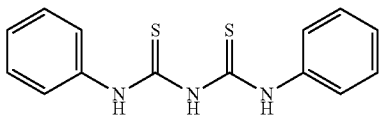
(3b)

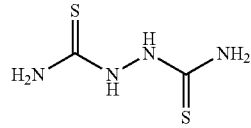
(3c)

(2) Dione Compound

In the dione compound, the stability during charge and discharge (an oxidized state and a reduced state) is excellent as with the dithione compound, and multi-electron reaction of two-electrons or more can occur in the oxidation-reduction reaction. Accordingly, when the dione compound is used for the positive electrode active material, and furthermore the sulfone compound is contained in the electrolyte solution 9, and moreover a part of the electrode active material is oligomerized at least at the first time of charge and discharge, a charge-discharge reaction occurring between the positive electrode 4 and the negative electrode 6 is stabilized and thereby charge and discharge of a multi-electron reaction can be stably repeated, and therefore it becomes possible to obtain a secondary battery having a high capacity density, which has high charge-discharge efficiency and improved cycle characteristics.

Although such a dione compound is not particularly limited as long as it has a dione structure in its structural unit, a compound represented by the following general formula (4) or (5) can be preferably used.

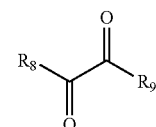
(4)

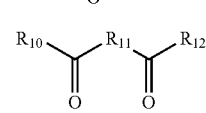
(5)

In the chemical formula (4) or (5), $R_8$ to $R_{10}$ and $R_{12}$ represent any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group, and linking groups composed of combination of one or more thereof, and these $R_8$ to $R_{10}$ and $R_{12}$ include the case in which they are the same and the case in which they are linked with one another to form a saturated or unsaturated cyclic structure. Further, $R_{11}$ represents at least one of a substituted or unsubstituted alkylene group, a substituted or unsubstituted arylene group and a substituted or unsubstituted imino group, and it includes the case in which the imino groups are linked with each other.

The following chemical reaction formula (III) shows an example of the charge-discharge reaction which is predicted when the dione compound represented by the general formula (4) is used for the positive electrode active material and Li is used for a cation of an electrolyte salt.

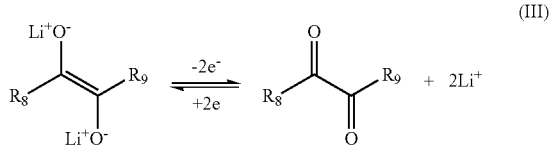
(III)

The following chemical reaction formula (IV) shows an example of the charge-discharge reaction which is predicted when the dione compound represented by the general formula (5) is used for the positive electrode active material and Li is used for a cation of an electrolyte salt.

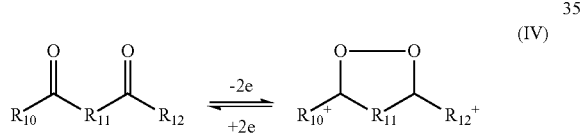
(IV)

Although the dione compound is not particularly limited as long as it is a low-molecular-weight compound which can be oligomerized as with the dithione compound, when a portion other than a dione structure is large, a molecular weight is increased and therefore an electric storage capacity per unit mass, or a capacity density, is reduced. Accordingly, the molecular weight of a portion other than the dione structure is preferably small.

Dione compounds falling within the category of the compounds represented by the general formula (4) may, for example, include organic compounds represented by the following chemical formula (4a) or (4b), and examples of dione compounds falling within the category of the compounds represented by the general formula (5) may, for example, include organic compounds represented by the following chemical formulas (5a)-(5d).

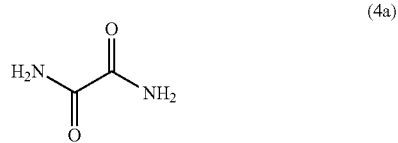
(4a)

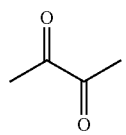
(4b)

(3) Diamine Compound

In the diamine compound, the stability during charge and discharge—i.e. an oxidized state and a reduced state—is excellent as with the dithione compound and dione compound, and multi-electron reaction of two-electrons or more can occur in the oxidation-reduction reaction. Accordingly, when the diamine compound is used for the positive electrode active material, and furthermore the sulfone compound is contained in the electrolyte solution 9, and moreover a part of the electrode active material is oligomerized at least at the first time of charge and discharge, a charge-discharge reaction occurring between the positive electrode 4 and the negative electrode 6 is stabilized and thereby charge and discharge of a multi-electron reaction can be stably repeated, and therefore it becomes possible to obtain a secondary battery having a high capacity density, which has high charge-discharge efficiency and improved cycle characteristics.

Although such a diamine compound is not particularly limited as long as it has a diamine structure in its structural unit, an organic compound represented by the following general formula (5) can be preferably used.

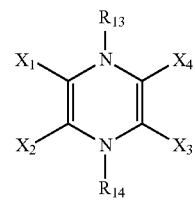
(5)

In the general formula (5), $R_{13}$ and $R_{14}$ represent any of a substituted or unsubstituted alkyl group, a substituted or unsubstituted alkylene group, a substituted or unsubstituted arylene group, a substituted or unsubstituted carbonyl group, a substituted or unsubstituted acyl group, a substituted or unsubstituted alkoxycarbonyl group, a substituted or unsubstituted ester group, a substituted or unsubstituted ether group, a substituted or unsubstituted thioether group, a substituted or unsubstituted amine group, a substituted or unsubstituted amide group, a substituted or unsubstituted sulfone group, a substituted or unsubstituted thiosulfonyl group, a substituted or unsubstituted sulfonamide group, a substituted or unsubstituted imine group, a substituted or unsubstituted azo group, and linking groups composed of combination of one or more thereof. $X_1$ to $X_4$ represent at least one of a hydrogen atom, a halogen atom, a hydroxyl group, a nitro group, a cyano group, a carboxyl group, a substituted or unsubstituted alkyl group, a substituted or unsubstituted alkenyl group, a substituted or unsubstituted cycloalkyl group, a substituted or unsubstituted aryl group, a substituted or unsubstituted aromatic heterocyclic group, a substituted or unsubstituted aralkyl group, a substituted or unsubstituted amino group, a substituted or unsubstituted alkoxy group, a substituted or unsubstituted aryloxy group, a substituted or unsubstituted alkoxycarbonyl group, a substituted or unsubstituted aryloxycarbonyl group, a substituted or unsubstituted acyl group and a substituted or unsubstituted acyloxy group, and these substituents include the case of forming a cyclic structure therebetween.

The following chemical reaction formula (V) shows an example of the charge-discharge reaction which is predicted when the organic compound represented by the general formula (5) is used for the positive electrode active material and Li is used for a cation of an electrolyte salt.

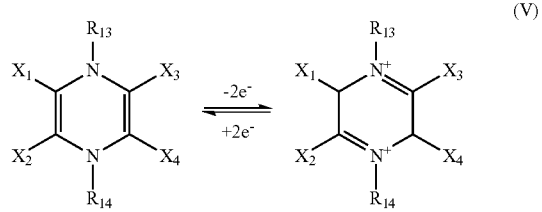

(V)

Although the diamine compound is not particularly limited as long as it is a low-molecular-weight compound which can be oligomerized as with the dithione compound and the dione compound, when a portion other than a diamine structure is large, a molecular weight is increased and therefore an electric storage capacity per unit mass, or a capacity density, is reduced. Accordingly, the molecular weight of a portion other than the diamine structure is preferably small.

As organic compounds falling within the category of the compounds represented by the general formula (5), organic compounds containing, in structural unit thereof, a phenazine structure in which aryl groups are coupled with each other with a pyrazine ring interposed therebetween, is more preferred, and for example, an organic compound represented by the chemical formulas (6a) and (6b) can be preferably used.

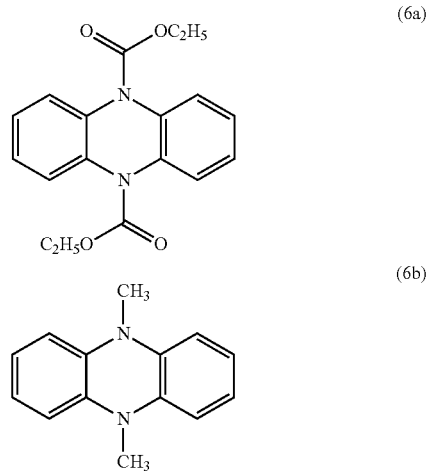

(6a)

(6b)

While the positive electrode active material has a varying structure and state depending on a charge state, a discharge state or an intermediate state thereof since the positive electrode active material is reversibly oxidized or reduced by charging and discharging, in the present embodiment, the positive electrode active material is contained in any one of a reaction starting material (a substance initiating a chemical reaction in an electrode reaction in the battery), a reaction product (a substance produced as a result of the chemical reaction), and an intermediate product in at least a discharge reaction, and thereby, it is possible to realize a secondary battery which has a positive electrode active material having high charge-discharge efficiency and a high capacity density.

Next, an example of a method for producing the secondary battery will be described in detail.

First, a positive electrode active material is formed into an electrode shape. That is, any of the organic compound described above is prepared. Then, the organic compound is mixed with a conductive material and a binder, a solvent is then added to the resulting mixture to prepare slurry for an active material, and the slurry for an active material is applied onto a positive electrode current collector by an arbitrary coating method and dried to form a positive electrode active material. Thereby, a positive electrode 4, in which the positive electrode active material is formed on the positive electrode current collector, is obtained.

The conductive material is not particularly limited, and for example, carbonaceous fine particles such as graphite, carbon black, and acetylene black; carbon fibers such as vapor-grown carbon fibers, carbon nanotubes, and carbon nanohorns; and conductive polymers such as polyaniline, polypyrrole, polythiophene, polyacetylene, and polyacene can be used. Further, two or more kinds of the conductive materials can be mixed for use. In addition, the content of the conductive material in the positive electrode active material is preferably 10-80% by weight.

Also, the binder is not particularly limited, and various resins such as polyethylene, polyvinylidene fluoride, polyhexafluoropropylene, polytetrafluoroethylene, polyethylene oxide, and carboxymethyl cellulose can be used.

Moreover, the solvent used for the slurry for an active material is not particularly limited, and for example, basic solvents such as dimethylsulfoxide, dimethylformamide, N-methylpyrrolidone, propylene carbonate, diethyl carbonate, dimethyl carbonate, and γ-butyrolactone; non-aqueous solvents such as acetonitrile, tetrahydrofuran, nitrobenzene, and acetone; and protic solvents such as methanol and ethanol can be used.

Besides, a kind of the solvents, a mixing ratio of the organic compound and the solvent, and a kind and addition amount of the conductive materials and the binders, and the like can be optionally set in consideration of required characteristics, productivity and the like of the secondary battery.

Then, the positive electrode 4 is impregnated with an electrolyte solution 9 containing a sulfone compound to allow the electrolyte solution 9 to permeate the positive electrode 4, and thereafter, the separator 5 impregnated with the electrolyte solution 9 is laminated on the positive electrode 4, and the negative electrode 6 and the negative electrode current collector 7 are laminated in turn, and thereafter, the electrolyte solution 9 is filled into an internal space. Then, a metallic spring 8 is placed on the negative electrode current collector 9, and a gasket 10 is arranged at a periphery, and a negative electrode case 3 is attached fixedly to a positive electrode case 2, and these cases are externally sealed with a caulking machine to prepare a coin type secondary battery.

In the secondary battery, upon starting the first time of charge and discharge, a part of the organic compound predominantly constituting the positive electrode active material is dissolved in a sulfone compound in the electrolyte solution 9 and the dissolved organic compound is polymerized with the sulfone compound to be oligomerized. It is thought that a part of the oligomerized organic compound remains in the vicinity of the positive electrode 4 and the rest of the oligomerized organic compound moves near the negative electrode 6 in the electrolyte solution 9. Since as described above, the oligomerized organic compound is present in the vicinity of the positive electrode 4, the oligomerized organic compound can be a barrier for suppressing excessive dissolution of the positive electrode active material in the electrolyte solution 9. Further, presence of the oligomerized organic compound near the negative electrode 6 allows SEI to be formed, and consequently the negative electrode 6 can smoothly occlude/release lithium, and thereby, the charge-discharge reaction is stabilized and it becomes possible to improve cycle characteristics.

As described above, according to the present embodiment, since the positive electrode active material has, as the main component thereof, a low-molecular-weight multi-electron organic compound which has two or more electrons to be involved in a battery electrode reaction, the sulfone compound is contained in the solvent of the electrolyte solution 9 and apart of the electrode active material is oligomerized at least at the first time of charge and discharge, a charge-discharge reaction is stabilized and it becomes possible to improve cycle characteristics.

Furthermore, the positive electrode active material contains the organic compound as the main component, and therefore the resulting secondary battery is a secondary battery in which an environmental burden is low and its safety is taken into consideration.

Besides, the present invention is not limited to the above-mentioned embodiments, and various variations may be made without departing from the gist of the invention. For example, in the above embodiment, as the organic compound predominantly constituting the positive electrode active material, the dithione compounds, the dione compounds and diamine compounds are exemplified, and furthermore, the organic compound may be a multi-electron organic compound having a low molecular weight, and an organic radical compound having a stable radical group may be used. The sulfone compound is not limited to the compounds listed above.

In the present invention, a part of the electrode active material has only to be oligomerized at least at the first time of charge and discharge, and this includes the case in which a part of the electrode active material is also oligomerized at the second or later time of charge and discharge.

Further, in the above-mentioned embodiment, the organic compound is used for the positive electrode active material, but the organic compound may be used for the negative electrode active material.

In the above-mentioned embodiment, the coin type secondary battery has been described, and furthermore it is needless to say that a shape of the battery is not particularly limited, and the present invention can also be applied to a cylindrical battery, a prismatic battery, a sheet-shaped battery, and the like. Also, a casing method is not also particularly limited, and a metal case, a molded resin, an aluminum laminate film or the like may be used for a casing.

Next, Examples of the present invention will be specifically described.

Besides, each of Examples shown below is just an example, and the present invention is not limited to Examples below.

EXAMPLES

Example 1

Preparation of Battery Cell

As a material for an active material, a rubeanic acid represented by the chemical formula (2a) was prepared, and sulfolane represented by the chemical formula (1a) was prepared as a solvent of an electrolyte solution.

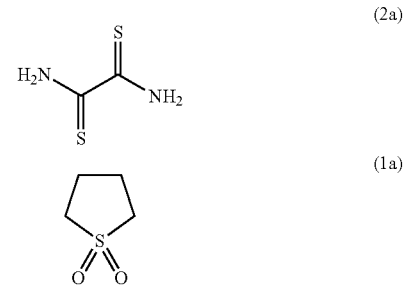

Then, 300 mg of the rubeanic acid, 600 mg of graphite powder as a conductive material, and 100 mg of polytetrafluoroethylene resin as a binder were respectively weighed, and these weighed materials were kneaded while being uniformly mixed as a whole to obtain a mixture.

Subsequently, the mixture was pressure-formed to prepare a sheet-shaped member having a thickness of about 150 µm. Then, the sheet-shaped member was dried at 70° C. for 1 hour in vacuum, and then punched out into a round shape with a diameter of 12 mm to prepare a positive electrode active material containing the rubeanic acid as a main component.

Next, $LiN(C_2F_5SO_2)_2$ (electrolyte salt) having a mole concentration of 1.0 mol/L was dissolved in sulfolane to prepare an electrolyte solution.

The positive electrode active material was applied onto a positive electrode current collector, and then a separator having a thickness of 20 µm, which was made of a polypropylene porous film impregnated with the electrolyte solution, was laminated on the positive electrode active material, and further a negative electrode obtained by bonding lithium to a negative electrode current collector made of a copper foil was laminated on the separator to form a laminate.

Then, 0.2 mL of the electrolyte solution was added dropwise to the laminate to impregnate the laminate with the electrolyte solution.

Thereafter, a metallic spring was placed on the negative electrode current collector, and a negative electrode case was joined to a positive electrode case with a gasket arranged at its periphery, and these cases were externally sealed with a caulking machine. Thereby, a hermetically sealed coin type battery cell, in which the positive electrode active material contained a rubeanic acid as a main component, the negative electrode active material was formed of metal lithium, and the electrolyte solution was formed of $LiN(C_2F_5SO_2)_2$ and sulfolane, was prepared.

Check of Operation of Battery Cell

The battery cell thus prepared was charged at a constant current of 0.1 mA until a voltage reached 4.0 V, and thereafter, was discharged at a constant current of 0.1 mA until a voltage reached 1.5 V.

Thereafter, a cycle of charge and discharge was repeated 20 times in a range of 4.0-1.5 V to perform a cycle characteristic test.

Figure 2:
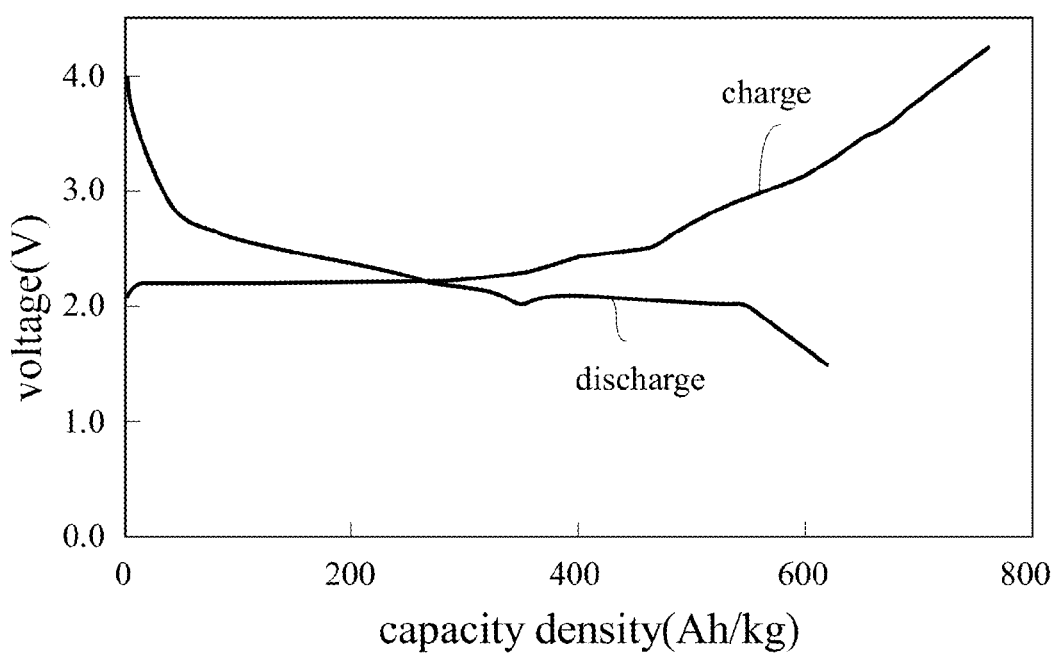
FIG. 2 is a drawing showing a charge and discharge characteristic in Example 1.

FIG. 2 shows charge and discharge curves at the time when the second time of charge and discharge, in which the charge and discharge characteristic is stabilized, was performed. The horizontal axis indicates a capacity density (Ah/kg) and the vertical axis indicates a voltage (V).

As is found from FIG. 2, it was verified that this battery cell is a secondary battery which has plateaus at two locations where charge and discharge voltages are 2.2 V and 2.4 V and has a discharge capacity of approx. 600 Ah/kg in terms of a capacity density.

Figure 3:
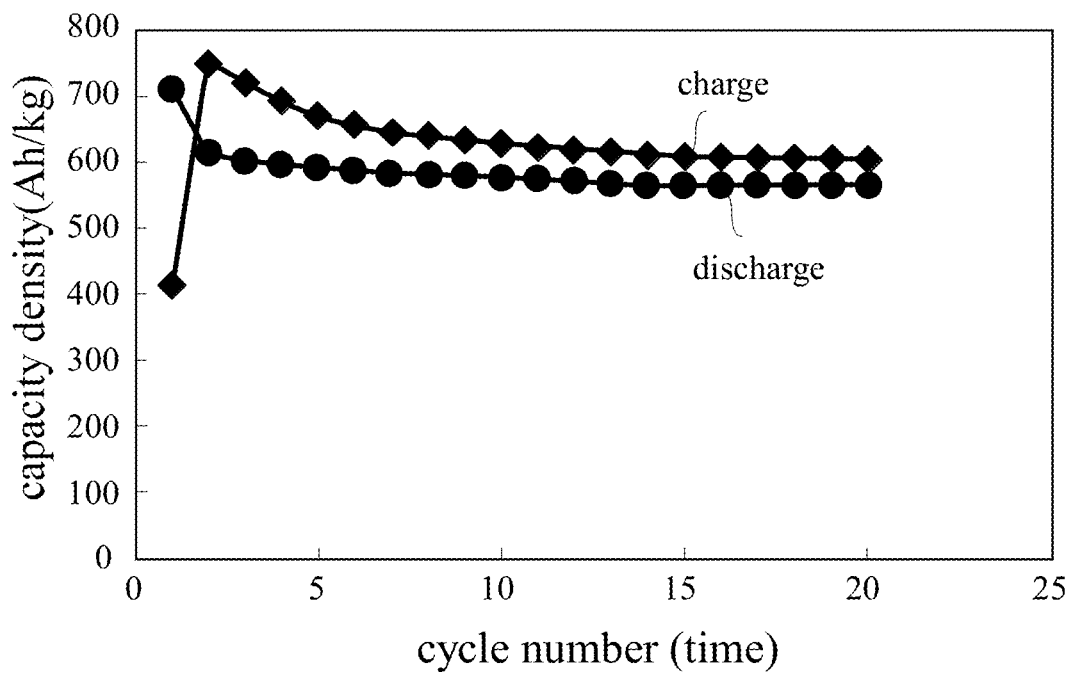
FIG. 3 is a drawing showing a cycle characteristic in Example 1.

FIG. 3 shows cycle characteristics. The horizontal axis indicates the cycle number (time) and the vertical axis indicates a capacity density (Ah/kg).

As is apparent from FIG. 3, it is possible to ensure 90% or more of the capacity density at the time of the second discharge even after repeating a charge-discharge cycle 20 times, and thereby, it was found that a secondary battery, which has small deterioration of capacity even in repeating charge and discharge, and has high charge-discharge efficiency and improved cycle characteristics, can be obtained.

Besides, it is thought to be for the following reason that in FIG. 3, the capacity density at the time of the second charge was largely increased compared with the capacity density at the time of the first charge.

When the rubeanic acid is used for the positive electrode active material and metal Li is used for the negative electrode active material, it is thought that an oxidation-reduction reaction represented by the chemical reaction formula (I') takes place if repeating charge and discharge.

negative electrode case, a lower left portion is a positive electrode case, and a right portion is an internal. Further, FIG. 5 indicates a surface of the separator.

Figure 4:
FIG. 4 is a photograph showing a state of a battery cell disassembled after the completion of a cycle characteristic test in Example 1.
Figure 5:
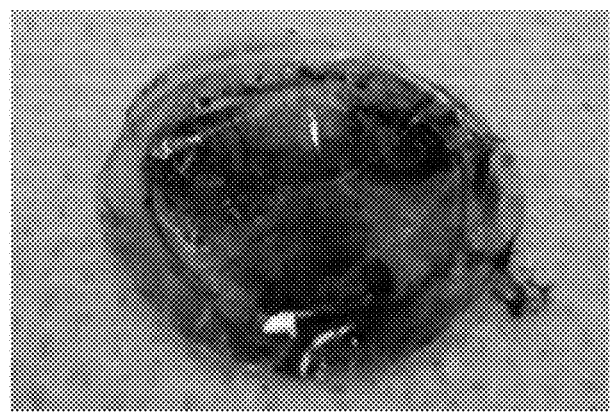
FIG. 5 is a photograph showing a state of a colored component of a separator in Example 1.

As is apparent from FIGS. 4 and 5, it was found that the separator in contact with the positive electrode and the negative electrode was colored.

Next, using High-Performance Liquid Chromatography (hereinafter referred to as "HPLC") manufactured by Shimadzu Corp., this color component was analyzed in a Size Exclusion Chromatography (hereinafter referred to as "SEC") mode.

Figure 6:
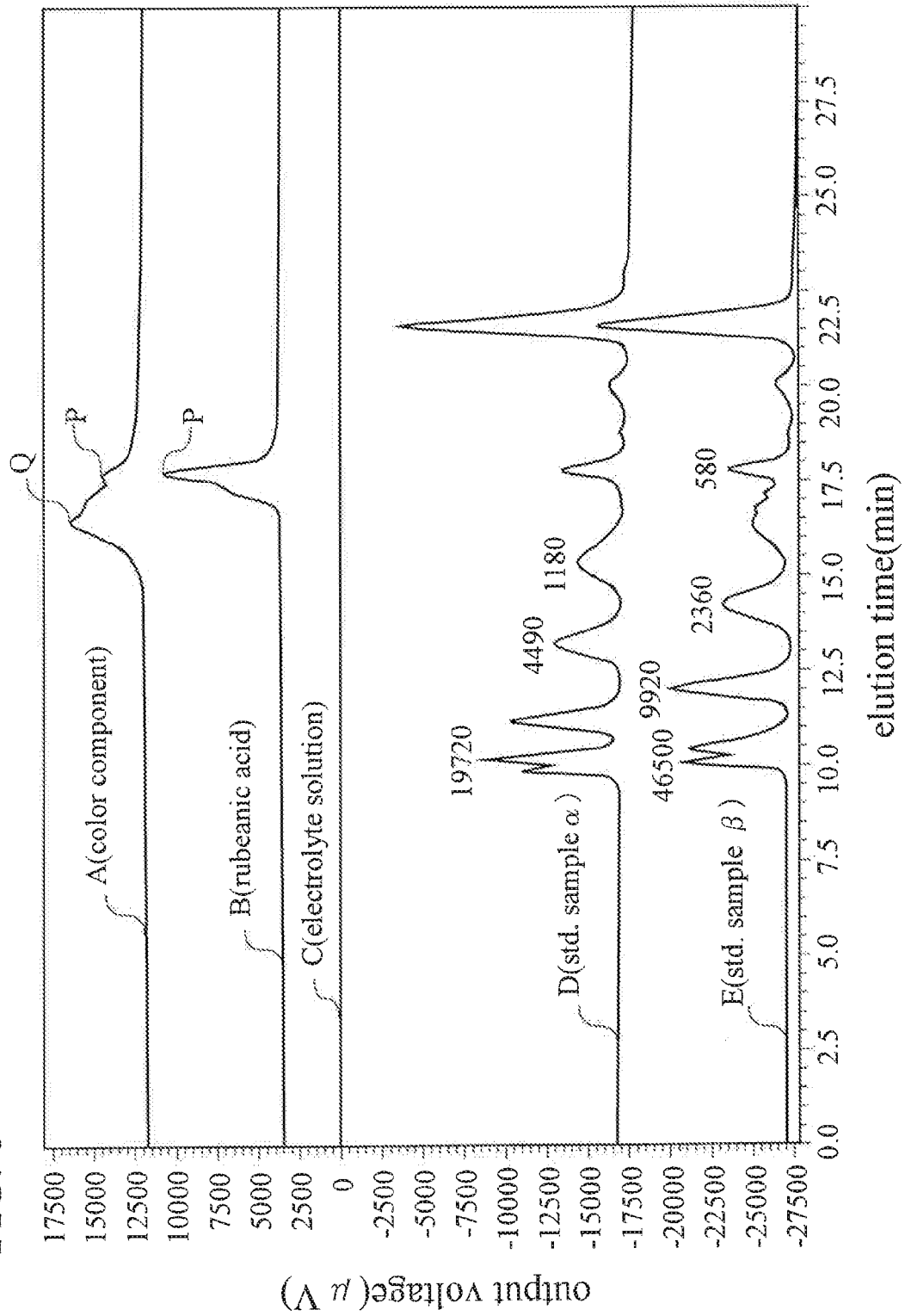
FIG. 6 is a drawing showing a chromatogram in a SEC mode in HPLC chromatography in Example 1.

FIG. 6 is a chart showing chromatogram thereof, and the horizontal axis indicates an elution time (min) and the vertical axis indicates an output voltage (μV).

In FIG. 6, a curve A indicates a chromatogram of a color component, a curve B indicates a chromatogram of rubeanic acid, a curve C indicates a chromatogram of an electrolyte solution, a curve D indicates a chromatogram of a standard sample α, and a curve E indicates a chromatogram of a standard sample β.

In this SEC mode, two kinds of polystyrenes whose molecular weights are known were used as standard samples. Then, a calibration curve was made based on a molecular weight distribution obtained from the chromatograms of the standard samples α and β respectively, and the molecular weight of the colored component A was estimated from the calibration curve.

That is, numerical values shown above peaks of the curve D and the curve E indicate molecular weights corresponding elution times of the standard samples α and β, and the calibration curve was made based on the elution times and the molecular weights corresponding the elution times.

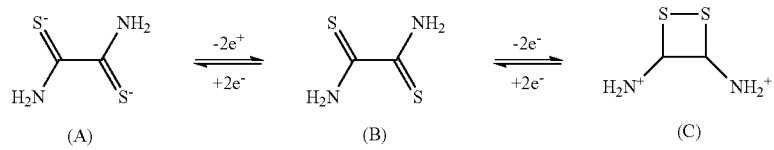

That is, in the positive electrode, giving and receiving of electrons is performed with Li ions from the negative electrode by changing a state of electrical charges from a discharged state (A) of bearing a negative charge to a charged state (C) of bearing a positive charge, and thereby, charging/discharging phenomena are observed. Accordingly, a total of four electrons are released from a molecule of rubeanic acid during the transition from the discharged state (A) to the charged state (C).

On condition of an initial state, the battery starts from a neutral rubeanic acid (B) which does not bear electrical charges and becomes the charged state (C) through oxidation of the rubeanic acid, and therefore, only two electrons are released.

Accordingly, charging is started from the discharged state (A) at the second time or later, but charging is started from the neutral rubeanic acid (B) in the initial state, and therefore it is thought that the capacity density at the time of the second charge was largely increased compared with the capacity density at the time of the first charge.

Next, the battery cell was disassembled after the completion of the cycle characteristic test and the interior was observed.

FIGS. 4 and 5 are views showing a state in which a battery cell is disassembled. In FIG. 4, an upper left portion is a Then, a molecular weight was estimated from a peak Q of the color component A and an elution time corresponding the peak Q based on the calibration curve, and consequently the molecular weight of the color component A was 447.

On the other hand, the molecular weight of rubeanic acid is 120, and therefore it was confirmed that the molecular weight was increased.

Further, since the elution time corresponding the peak Q of the color component A was shorter than the elution time corresponding the peak P of rubeanic acid B and further a peak P of rubeanic acid B was also observed in the chromatogram of the color component A, it is thought that the color component A contains rubeanic acid.

As described above, it was found that a part of the rubeanic acid was dissolved in the electrolyte solution and polymerized with sulfolane in the electrolyte solution, and thereby the rubeanic acid was oligomerized to form a substance having a molecular weight of 447. Thus, it was confirmed that a secondary battery having high charge-discharge efficiency and improved cycle characteristics as described above is obtained when a part of the rubeanic acid is polymerized with sulfolane of a sulfone compound and oligomerized like this.

Example 2

Preparation of Battery Cell

A battery cell was prepared by following the same method/procedure as in Example 1 except for using, as a solvent for an electrolyte solution, ethyl isopropyl sulfone represented by a chemical formula (Ig) in place of sulfolane.

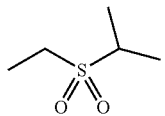

(Ig)

Check of Operation of Battery Cell

The battery cell was charged and discharged in the same conditions as in Example 1 and their operation was checked.

Figure 7:
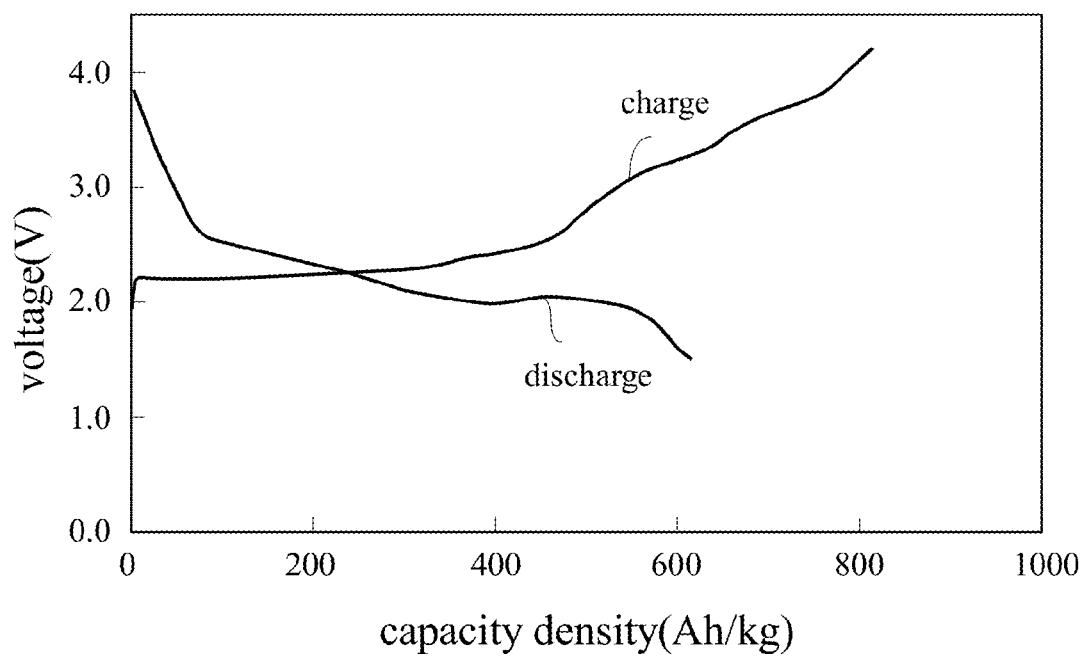
FIG. 7 is a drawing showing a charge and discharge characteristic in Example 2.

FIG. 7 shows charge and discharge curves at the time when the second time of charge and discharge, in which the charge and discharge characteristic is stabilized, was performed. The horizontal axis indicates a capacity density (Ah/kg) and the vertical axis indicates a voltage (V).

As is apparent from FIG. 7, it was verified that the battery is a secondary battery which has plateaus at two locations where charge and discharge voltages are 2.2 V and 2.4 V and has a discharge capacity of about 600 Ah/kg in terms of a capacity density.

Figure 8:
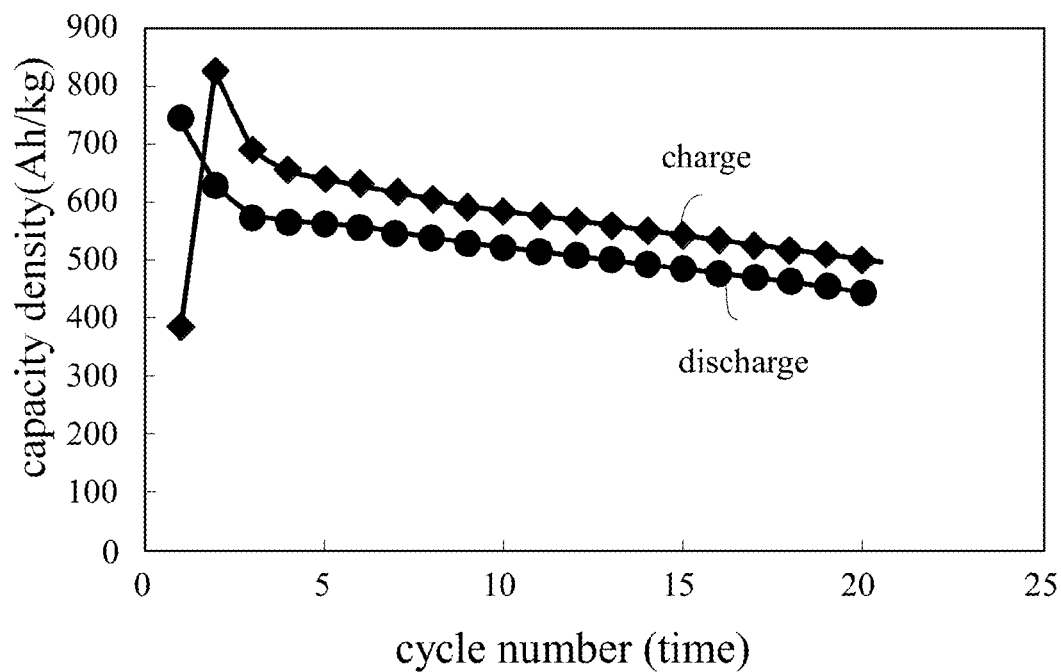
FIG. 8 is a drawing showing a cycle characteristic in Example 2.

FIG. 8 shows cycle characteristics. The horizontal axis indicates the cycle number (time) and the vertical axis indicates a capacity density (Ah/kg).

As is apparent from FIG. 8, it is possible to ensure 70% or more of the capacity density at the time of the second discharge even after repeating a charge-discharge cycle 20 times, and thereby, it was found that a secondary battery, which has small deterioration of capacity even after repeating charge and discharge, and has high charge-discharge efficiency and improved cycle characteristics, can be obtained.

Next, the battery cell was disassembled after the completion of the cycle characteristic test, and the interior was observed.

Figure 9:
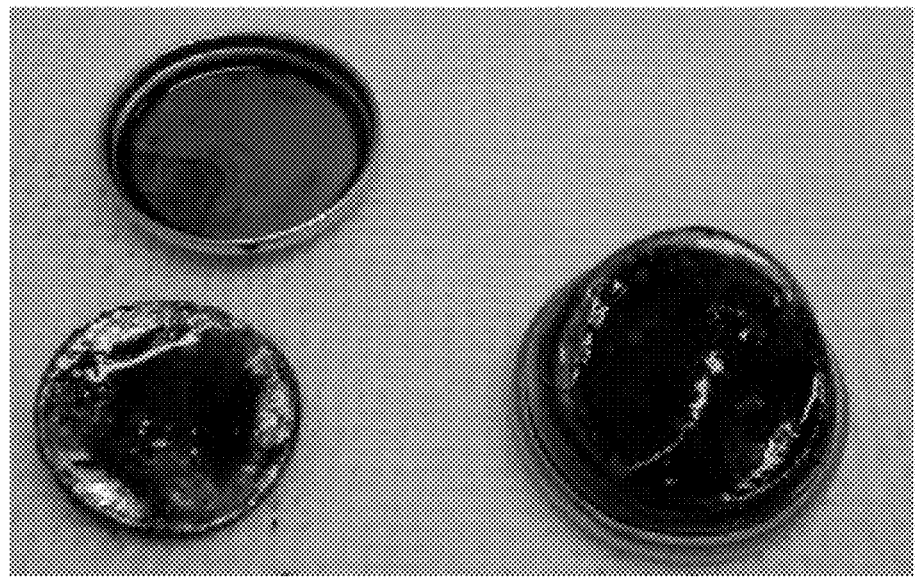
FIG. 9 is a photograph showing a state of a battery cell disassembled after the completion of a cycle characteristic test in Example 2.
Figure 10:
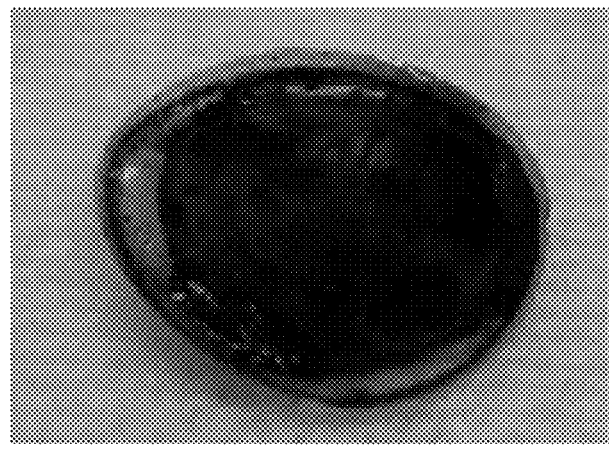
FIG. 10 is a photograph showing a state of a color component of a separator in Example 2.

FIGS. 9 and 10 are views showing a state in which a secondary battery is disassembled. In FIG. 9, an upper left portion is a negative electrode case, a lower left portion is a positive electrode case, and a right portion is an internal. FIG. 10 indicates a state in which an organic substance adheres to the separator.

As is apparent from FIGS. 9 and 10, it was found that the separator in contact with the positive electrode and the negative electrode was colored as with Example 1. That is, it is thought that also in Example 2, a part of the rubeanic acid was dissolved in the electrolyte solution and polymerized with ethyl isopropyl sulfone (sulfone compound) in the electrolyte solution to be oligomerized.

Comparative Example

Preparation of Battery Cell

A battery cell was prepared by following the same method/procedure as in Example 1 except for using, as a solvent for an electrolyte solution, diethyl carbonate represented by a chemical formula (100) in place of sulfolane.

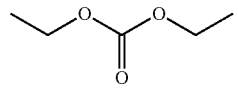

(100)

Check of Operation of Battery Cell

The battery cell was charged and discharged in the same conditions as in Example 1 and their operation was checked.

Figure 11:
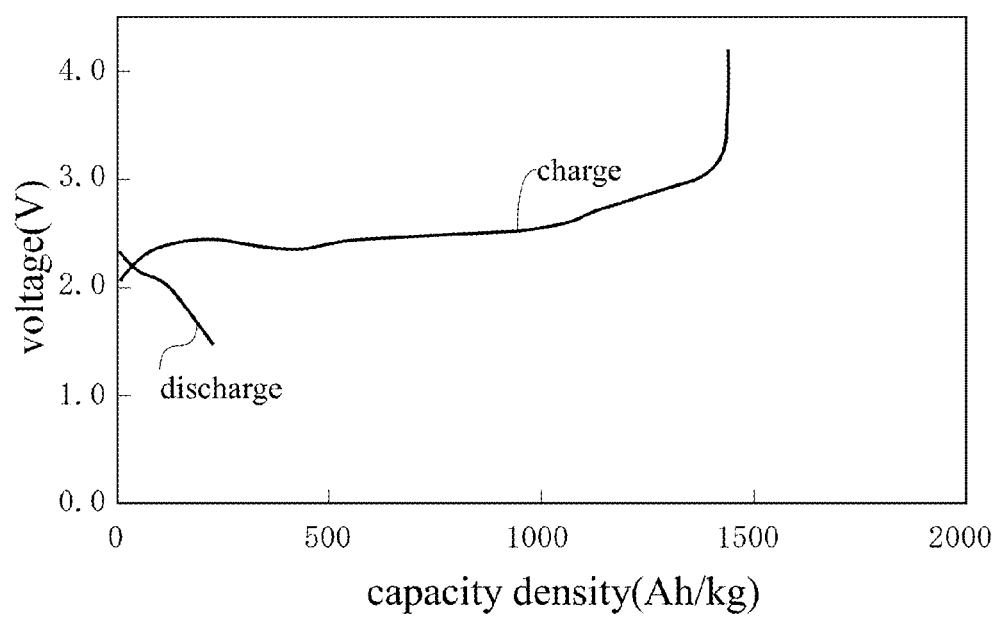
FIG. 11 is a drawing showing a charge and discharge characteristic in Comparative Example.

FIG. 11 shows charge and discharge curves at the time when the second time of charge and discharge was performed. The horizontal axis indicates a capacity density (Ah/kg) and the vertical axis indicates a voltage (V).

As is apparent from FIG. 11, the battery does not have a flat voltage region during discharge, the capacitance density decreased right from the beginning of discharge and the capacitance density at the end of discharge was as low as 250 Ah/kg.

Figure 12:
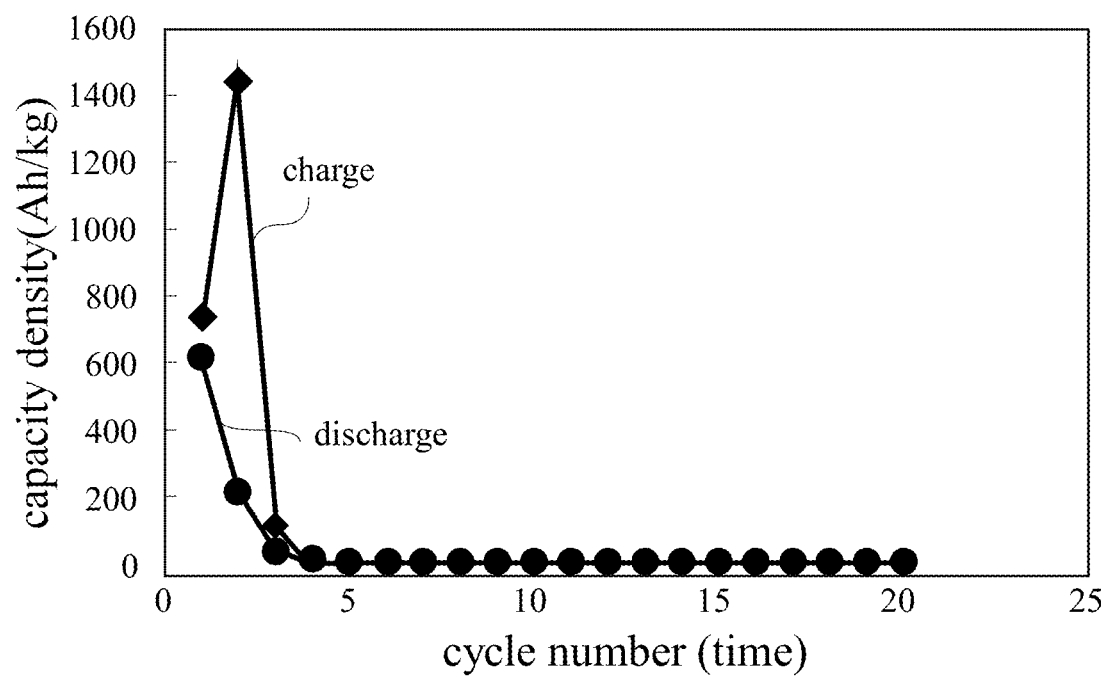
FIG. 12 is a drawing showing a cycle characteristic in Comparative Example.

FIG. 12 shows cycle characteristics. The horizontal axis indicates the cycle number (time) and the vertical axis indicates a capacity density (Ah/kg).

As is apparent from FIG. 12, it was found that although charge and discharge was performed, the discharge capacity of the second or later discharge was 40% or less of the first discharge capacity and the cycle characteristic was extremely deteriorated.

Figure 13:
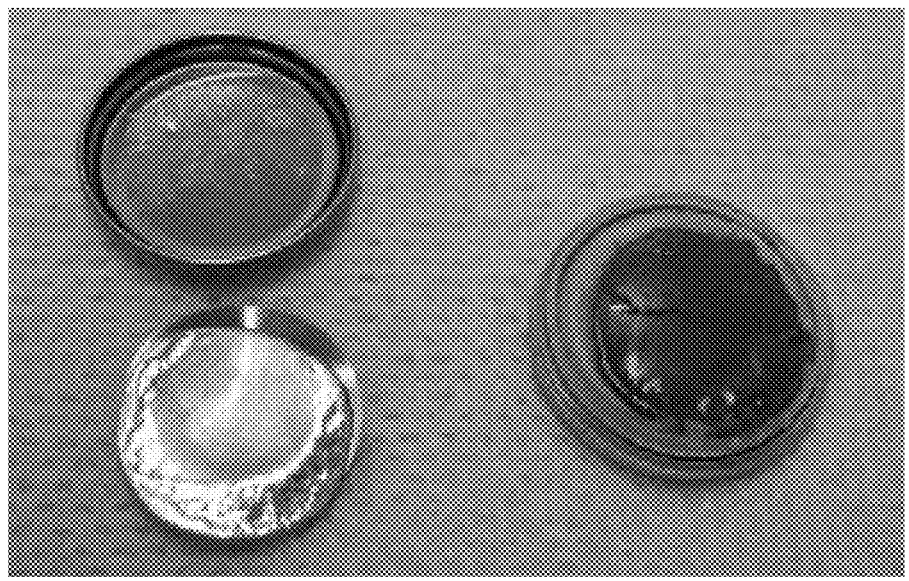
FIG. 13 is a photograph showing a state of a battery cell disassembled after the completion of a cycle characteristic test in Comparative Example.
Figure 14:
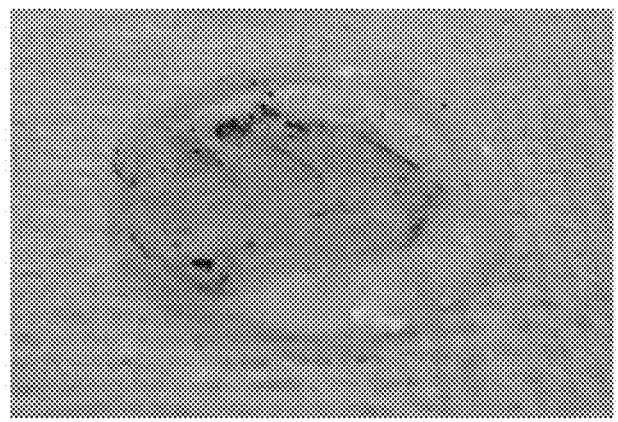
FIG. 14 is a photograph showing a state of a colored component of a separator of Comparative Example.

FIGS. 13 and 14 are views showing a state in which a secondary battery is disassembled. In FIG. 13, an upper left portion is a negative electrode case, a lower left portion is a positive electrode case, and a right portion is an internal. FIG. 14 indicates a surface of the separator.

As is apparent from FIGS. 13 and 14, it was found that the separator was found to be not colored. That is, it is thought that, in the Comparative Example, although the rubeanic acid is dissolved in the electrolyte solution at the time of charge and discharge because diethyl carbonate which is a non-sulfone compound is used as a solvent for the electrolyte solution, the polymerization reaction does not occur. Therefore it is not oligomerized and the dissolved compound causes contamination of the electrode and the like, resulting in the above-mentioned deterioration of the cycle characteristics.

A secondary battery having a high capacity density and high output, and excellent and stable cycle characteristics with small deterioration of capacity even after repeated charge and discharge is realized.

REFERENCE SIGNS LIST

4 Positive electrode
6 Negative electrode
9 Electrolyte solution

The invention claimed is:
1. A secondary battery comprising:
an electrode active material; and
an electrolyte solution having an electrolyte salt in a solvent,
wherein the electrode active material contains, as a main component thereof, a multi-electron organic compound which has two or more electrons to be involved in a battery electrode reaction,
the solvent contains a sulfone compound, and
a part of the electrode active material is oligomerized at least at a first time of charge and discharge of the secondary battery.

2. The secondary battery according to claim 1, wherein the sulfone compound is represented by the general formula:

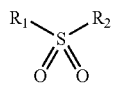

wherein $R_1$ and $R_2$ are at least one of a linear alkyl group and a branched alkyl group respectively having 1 to 5 carbon atoms.

3. The secondary battery according to claim 2, wherein $R_1$ and $R_2$ are the same or are linked with each other to form a saturated or unsaturated ring.

4. The secondary battery according to claim 1, wherein the multi-electron organic compound contains, in structural unit thereof, at least one selected from the group consisting of dithione compounds having a dithione structure, dione compounds having a dione structure, and diamine compounds having a diamine structure.

5. The secondary battery according to claim 4, wherein the dithione compound is represented by the general formula:

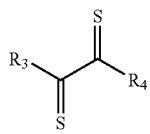

wherein $R_3$ and $R_4$ are any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group, and linking groups composed of combination of one or more thereof.

6. The secondary battery according to claim 5, wherein $R_3$ and $R_4$ are the same or are linked with each other to form a saturated or unsaturated cyclic structure.

7. The secondary battery according to claim 4, wherein the dithione compound is represented by the general formula:

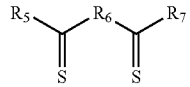

wherein $R_5$ and $R_7$ are any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group and linking groups composed of combination of one or more thereof, and $R_6$ is at least one of a substituted or unsubstituted alkylene group, a substituted or unsubstituted arylene group and a substituted or unsubstituted imino group.

8. The secondary battery according to claim 7, wherein $R_5$ and $R_7$ are the same or are linked with each other to form a saturated or unsaturated cyclic structure.

9. The secondary battery according to claim 7, wherein $R_6$ is the substituted or unsubstituted imino groups, and the imino groups are linked with each other.

10. The secondary battery according to claim 4, wherein the dione compound is represented by the general formula:

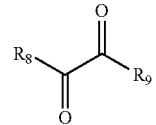

wherein $R_8$ and $R_9$ are any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group and linking groups composed of combination of one or more thereof.

11. The secondary battery according to claim 10, wherein $R_8$ and $R_9$ are the same or are linked with each other to form a saturated or unsaturated cyclic structure.

12. The secondary battery according to claim 4, wherein the dione compound is represented by the general formula:

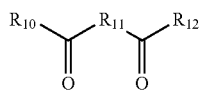

wherein $R_{10}$ and $R_{12}$ are any of a substituted or unsubstituted amino group, a substituted or unsubstituted imino group, a substituted or unsubstituted alkyl group, a substituted or unsubstituted alkylene group, a substituted or unsubstituted aryl group, a substituted or unsubstituted aralkyl group, a substituted or unsubstituted cycloalkyl group, a substituted or unsubstituted alkoxyl group, a substituted or unsubstituted alkenyl group, a substituted or unsubstituted aryloxy group, a substituted or unsubstituted arylamino group, a substituted or unsubstituted alkylamino group, a substituted or unsubstituted thioaryl group, a substituted or unsubstituted thioalkyl group, a substituted or unsubstituted heterocyclic group, a substituted or unsubstituted formyl group, a substituted or unsubstituted silyl group, a substituted or unsubstituted cyano group, a substituted or unsubstituted nitro group, a substituted or unsubstituted nitroso group, a substituted or unsubstituted carboxyl group, a substituted or unsubstituted alkoxycarbonyl group and linking groups composed of combination of one or more thereof, and $R_{11}$ is at least one of a substituted or unsubstituted alkylene group, a substituted or unsubstituted arylene group and a substituted or unsubstituted imino group.

13. The secondary battery according to claim 12, wherein $R_{10}$ and $R_{12}$ are the same or are linked with each other to form a saturated or unsaturated cyclic structure.

14. The secondary battery according to claim 12, wherein $R_{11}$ is the substituted or unsubstituted imino group, and the imino groups are linked with each other.

15. The secondary battery according to claim 4, wherein the diamine compound is represented by the general formula:

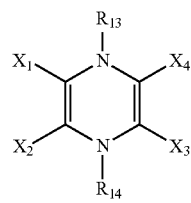

wherein $R_{13}$ and $R_{14}$ are any of a substituted or unsubstituted alkyl group, a substituted or unsubstituted alkylene group, a substituted or unsubstituted arylene group, a substituted or unsubstituted carbonyl group, a substituted or unsubstituted acyl group, a substituted or unsubstituted alkoxycarbonyl group, a substituted or unsubstituted ester group, a substituted or unsubstituted ether group, a substituted or unsubstituted thioether group, a substituted or unsubstituted amino group, a substituted or unsubstituted amide group, a substituted or unsubstituted sulfone group, a substituted or unsubstituted thiosulfonyl group, a substituted or unsubstituted sulfonamide group, a substituted or unsubstituted imino group, a substituted or unsubstituted azo group, and linking groups composed of combination of one or more thereof; and $X_1$ to $X_4$ are at least one of a hydrogen atom, a halogen atom, a hydroxyl group, a nitro group, a cyano group, a carboxyl group, a substituted or unsubstituted alkyl group, a substituted or unsubstituted alkenyl group, a substituted or unsubstituted cycloalkyl group, a substituted or unsubstituted aryl group, a substituted or unsubstituted aromatic heterocyclic group, a substituted or unsubstituted aralkyl group, a substituted or unsubstituted amino group, a substituted or unsubstituted alkoxy group, a substituted or unsubstituted aryloxy group, a substituted or unsubstituted alkoxycarbonyl group, a substituted or unsubstituted aryloxycarbonyl group, a substituted or unsubstituted acyl group and a substituted or unsubstituted acyloxy group.

16. The secondary battery according to claim 15, wherein $X_1$ to $X_4$ form a cyclic structure therebetween.

17. The secondary battery according to claim 1, wherein the electrode active material is contained in any one of a reaction starting material, a reaction product and an intermediate product in at least a discharge reaction of the battery electrode reaction.

18. The secondary battery according to claim 1, further comprising a positive electrode and a negative electrode, and the positive electrode contains the electrode active material as a main component thereof.

19. A method for charging and discharging a secondary battery containing an electrode active material and an electrolyte solution formed by dissolving an electrolyte salt in a solvent containing a sulfone compound, the method comprising:
repeating charging and discharging using a battery electrode reaction of the electrode active material,
wherein the electrode active material contains, as a main component thereof, a multi-electron organic compound which has two or more electrons to be involved in the battery electrode reaction, and
a part of the electrode active material is dissolved in and reacted with the electrolyte solution to be oligomerized at least at a first time of charge and discharge of the secondary battery.

* * * * *